(12) United States Patent
You (10) Patent No.: US 8,670,331 B2
(45) Date of Patent: Mar. 11, 2014

(54) METHOD AND APPARATUS FOR DETECTING ETHERNET OPERATION, ADMINISTRATION AND MAINTENANCE (OAM)

(75) Inventor: Yi You, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 231 days.

(21) Appl. No.: 13/375,888

(22) PCT Filed: Jun. 4, 2010

(86) PCT No.: PCT/CN2010/073552
§ 371 (c)(1),
(2), (4) Date: Dec. 2, 2011

(87) PCT Pub. No.: WO2010/139281
PCT Pub. Date: Dec. 9, 2010

(65) Prior Publication Data
US 2012/0069741 A1    Mar. 22, 2012

(30) Foreign Application Priority Data
Jun. 4, 2009    (CN) .......................... 2009 1 0143960

(51) Int. Cl.
*G01R 31/08*    (2006.01)

(52) U.S. Cl.
USPC ..................................................... 370/241.1

(58) Field of Classification Search
USPC ........... 370/229, 231, 241.1, 242, 252, 236.2, 370/230
See application file for complete search history.

(56) References Cited

U.S. PATENT DOCUMENTS 7,080,285 B2 * 7/2006 Kosugi et al. .................... 714/36
7,342,874 B2 * 3/2008 Pegrum et al. ................. 370/218
7,991,889 B2 * 8/2011 Byers et al. .................... 709/226

FOREIGN PATENT DOCUMENTS

| CN | 1334662 A | 2/2002 |
|---|---|---|
| CN | 1992651 A | 7/2007 |
| CN | 101345663 A | 1/2009 |
| EP | 1176759 A2 | 1/2002 |
| WO | WO-2009/049292 A | 4/2009 |

OTHER PUBLICATIONS

"Recommendation ITU-T Y.1731 (Feb. 2008)", ITU-T, Feb. 2008 the whole document [retrieved on Jul. 14, 2010], Retrieved from the internet:<URL:http://www.itu.int/rec./T-REC-Y.1731-200802-I>.
International Search Report for PCT/CN2010/073552 (in Chinese with English translation), mailed Sep. 9, 2010; ISA/CN.

* cited by examiner

*Primary Examiner* — Anh Ngoc Nguyen
(74) *Attorney, Agent, or Firm* — Harness, Dickey & Pierce, PLC (57) ABSTRACT

A method for detecting OAM includes: sending a detection maintenance entity OAM command to a network element equipment board after a user activating an established maintenance entity; receiving a reply message sent by the network element equipment board and acquiring replying board information and monitoring ID information matched with the maintenance entity; and starting a timer, and detecting whether preconfigured heartbeat detection time is reached, if not reached, detecting whether a OAM detection result which is reported by the network element equipment board and is matched with a monitoring ID is received, if received, transferring the OAM detection result to a network management interface to be displayed; and if reached, sending the heartbeat detection message, and detecting whether the OAM detection result which is reported by the network element equipment board and is matched with the monitoring ID is received after receiving a heartbeat reply message.

16 Claims, 4 Drawing Sheets

METHOD AND APPARATUS FOR DETECTING ETHERNET OPERATION, ADMINISTRATION AND MAINTENANCE (OAM)

CROSS-REFERENCE TO RELATED APPLICATIONS

This application is a 371 U.S. National Stage of International Application No. PCT/CN2010/073552, filed Jun. 4, 2010, and claims priority to Chinese patent application No. 200910143960.2 filed Jun. 4, 2009, the disclosures of which are herein incorporated by reference in their entirety.

TECHNICAL FIELD

The invention relates to the field of the communication technique, and in particular, to a method and an apparatus for detecting Ethernet Operation, Administration and Maintenance (OAM).

BACKGROUND OF THE RELATED ART

The Ethernet technique has been widely applied as its advantages of good economy, interoperability and ease of use and so on. With the continuous increase of the applications of the Ethernet technique in operating networks (Synchronous Digital Hierarchy (SDH)/Synchronous Optical NETwork (SONET)), reliability, security and manageability are also continuously challenged. The Ethernet Operation Administration and Maintenance (OAM) function provides a solution for solving this problem. However, at present, there is not a unified and intelligent solution for the network nodes of operators' configuring and detecting the Ethernet OAM, which makes the method for configuring and detecting the Ethernet OAM functions in the telecommunication network management system not flexible enough.

SUMMARY OF THE INVENTION

A method and an apparatus for detecting Ethernet OAM are provided by the present invention to solve the problems that the method for configuring and detecting the Ethernet OAM functions in the telecommunication network management system is not flexible enough in the prior art.

A method for detecting Ethernet OAM is provided by the present invention, and the method is based on a telecommunication network management system and comprises:

sending a detection maintenance entity OAM command to a network element equipment board after a user activating an established maintenance entity;

receiving a reply message sent by the network element equipment board and acquiring replying board information and monitoring Identifier (ID) information matched with the maintenance entity; and detecting whether preconfigured heartbeat detection time is reached:

if the preconfigured heartbeat detection time is not reached, detecting whether a OAM detection result which is reported by the network element equipment board and is matched with a monitoring ID is received, and if the OAM detection result is received, transferring the OAM detection result to a network management interface to be displayed;

if the heartbeat detection time is reached, sending a heartbeat detection message, and detecting whether the OAM detection result which is reported by the network element equipment board and is matched with the monitoring ID is received after receiving a heartbeat reply message, and if the OAM detection result is received, transferring the OAM detection result to the network management interface to be displayed.

Before the step of sending the detection maintenance entity OAM command, the method further comprises:

when the system is started, dynamically loading an Ethernet OAM plug-in deployed with Ethernet OAM configuration and detection functions according to a user preconfigured policy file; and generating an interface object responsible for managing all OAM function entrances after successfully loading the Ethernet OAM plug-in, and registering the interface object as a common object request broker architecture object.

After the step of sending the heartbeat detection message, the method further comprises:

when the heartbeat reply message is not received, judging whether times of not receiving the heartbeat reply message exceed a threshold, and if the times exceed the threshold, determining the network element equipment board is in an abnormal state, and ending this detection process; and if the times do not exceed the threshold, continuing to perform the step of detecting whether OAM detection result which is reported by the network element equipment board and is matched with the monitoring ID is received.

Before the step of detecting whether the OAM detection result which is reported by the network element equipment board and is matched with the monitoring ID is received, the method further comprises:

detecting whether the a stop OAM command sent by the user is received, and if the stop OAM command sent by the user is received, ending this detection process; performing the step of detecting whether the OAM detection result which is reported by the network element equipment board and is matched with the monitoring ID is received only if the stop OAM command sent by the user is not received.

After the step of detecting whether the OAM detection result which is reported by the network element equipment board and is matched with the monitoring ID is received, the method further comprises:

when the OAM detection result which is reported by the network element equipment board and is matched with the monitoring ID is not received, judging whether receiving time is overtime, and if the receiving time is overtime, ending this detection process; and if the receiving time is not overtime, returning to perform the step of detecting whether the preconfigured heartbeat detection time is reached.

After the step of detecting whether the OAM detection result which is reported by the network element equipment board and is matched with the monitoring ID is received, the method further comprises:

detecting a type of a OAM frame of the received OAM detection result, and if the type of the OAM frame is Ethernet continuity check, returning to perform the step of detecting whether the preconfigured heartbeat detection time is reached, and if the type of the OAM frame is not the Ethernet continuity check, ending this detection process.

The present invention further provides an apparatus for detecting Ethernet Operation Administration and Maintenance (OAM), and the apparatus is based on a telecommunication network management system and comprises: a detection command sending unit, an identifier information acquiring unit, a timing processing unit and a detection result acquiring unit, wherein the detection command sending unit is configured to: send a detection maintenance entity OAM command to a network element equipment board after a user activating an established maintenance entity;

the identifier information acquiring unit is configured to: receive a reply message sent by the network element equipment board, acquire replying board information and monitoring Identifier (ID) information matched with the maintenance entity, and trigger the timing processing unit;

the timing processing unit is configured to: detect whether preconfigured heartbeat detection time is reached, and if the preconfigured heartbeat detection time is reached, send a heartbeat detection message, and trigger the detection result acquiring unit after receiving a heartbeat reply message, and if the preconfigured heartbeat detection time is not reached, trigger the detection result acquiring unit; and the detection result acquiring unit is configured to: detect whether an OAM detection result which is reported by the network element equipment board and is matched with a monitoring ID is received, and if the OAM detection result is received, transfer the OAM detection result to a network management interface to be displayed.

The apparatus further comprises:

a plug-in loading unit, which is configured to: dynamically load an Ethernet OAM plug-in deployed with OAM configuration and detection functions according to a user preconfigured policy file when the system is started; and an interface object generating unit, which is configured to: generate an interface object responsible for managing all OAM function entrances after successfully loading the Ethernet OAM plug-in, and register the interface object as a common object request broker architecture object.

The timing processing unit is further configured to: judge whether times of not receiving the heartbeat reply message exceed a threshold when the heartbeat reply message is not received, and if the times exceed the threshold, determine the network element equipment board is in an abnormal state, and end this detection process; if the times do not exceed the threshold, trigger the detection result acquiring unit;

the detection result acquiring unit is further configured to: detect whether a stop OAM command sent by the user is received, and if the stop OAM command sent by the user is received, end this detection process; and the detection result acquiring unit is further configured to: determine whether receiving time is overtime when the OAM detection result which is reported by the network element equipment board and is matched with the monitoring ID is not received, and if the receiving time is overtime, end this detection process, and if the receiving time is not overtime, trigger the timing processing unit.

The apparatus further comprises:

the detection result detecting unit, which is configured to: detect a type of a OAM frame of the OAM detection result received by the detection result acquiring unit, and if the type of the OAM frame is Ethernet continuity check, trigger the timing processing unit, and if the type of the OAM frames is not the Ethernet continuity check, end this detection process.

Compared with the prior art, the present invention has the following advantages:

the method provided by the present invention uses a unique and intelligent detection algorithm, which can very stably and flexibly detect the Ethernet OAM, and the method used by the present invention is suitable for any telecommunication network management system. The Ethernet OAM functions can be implemented in the NMS or EMS, so it is very easy to configure and detect the Ethernet OAM for network elements of the whole network.

BRIEF DESCRIPTION OF DRAWINGS

In order to more clearly illustrate the technical scheme in the embodiments of the present invention and the prior art, the accompanying drawings which need to be used in the description of the embodiments and the prior art will be described simply hereinafter. Obviously, the accompanying drawings in the following description are only a plurality of embodiments of the present invention, and a person having ordinary skill in the art can further obtain other drawings based on these drawings in a premise without paying any creative work.

PREFERRED EMBODIMENTS OF THE PRESENT INVENTION

The technical scheme in the embodiments of the present invention will be clearly and fully described with reference to the accompanying drawings in the embodiments of the present invention hereinafter. Obviously, the described embodiments are merely a part of embodiments of the present invention, rather than all the embodiments. Based on the embodiments in the present invention, all the other embodiments obtained by a person having ordinary skill in the art in a premise without creative work shall all fall into the scope protected by the present invention.

A method and an apparatus for detecting OAM based on a telecommunication network management system is provided by the present invention to solve the problems that the method for configuring and detecting the Ethernet OAM functions in the telecommunication network management system is not flexible enough in the prior art.

Based on the above problems, the present invention provides a method for detecting OAM based on a telecommunication network management system, which configures the Ethernet OAM and detects the Ethernet OAM result through the telecommunication network management system with a plug-in mechanism. In the telecommunication network management system, the Ethernet OAM configuration and detection functions are implemented as an independent plug-in, which can be randomly loaded by users as necessary, support plug and play, and have strong flexibility.

Figure 1:
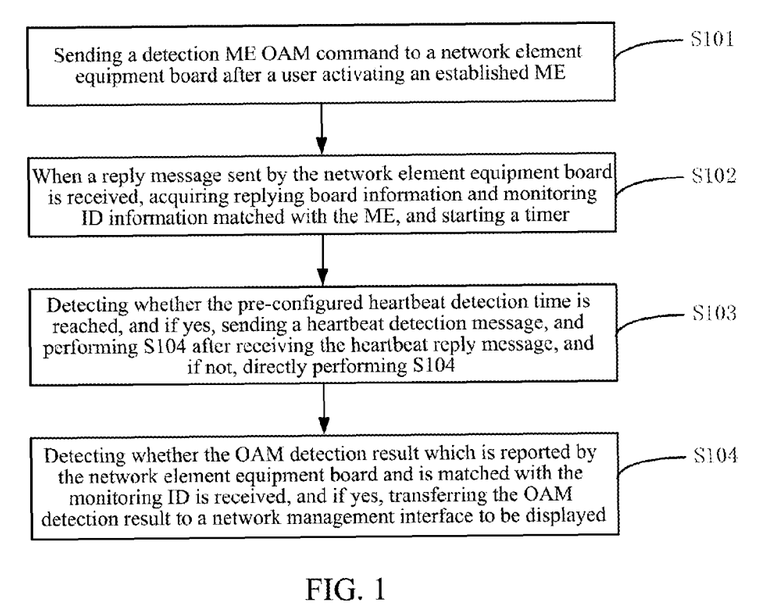
FIG. 1 is a flowchart of the method for detecting OAM based on a telecommunication network management system provided by the present invention.

In particular, the method for detecting OAM based on a telecommunication network management system provided by the present invention, as shown in FIG. 1, comprises following steps.

Step S101: a user sends detection Maintenance Entities (ME) OAM command to a Network Element (NE) equipment board after activating an established ME.

In particular, before this step, the method may further comprise the following operations:

(1) when the system is started, an Ethernet OAM plug-in deployed with OAM configuration and detection functions is dynamically loaded according to a user pre-configured policy file; and (2) an interface object responsible for managing all the OAM function entrances is generated after successfully loading the Ethernet OAM plug-in, and this interface object is registered as a common object request broker architecture object.

Step 102: when a reply message sent by the network element equipment board is received, the replying board information and monitoring Identifier (ID) information matched with the ME are acquired, and a timer is started.

Step 103: it is detected whether the preconfigured heartbeat detection time is reached, and if the preconfigured heartbeat detection time is reached, a heartbeat detection message is sent, and Step 104 is performed after receiving a heartbeat reply message, if the preconfigured heartbeat detection time is not reached, Step 104 is directly performed.

In Step 103, when the heartbeat reply message is not received, it is judged whether the times of not receiving the heartbeat reply message exceed a threshold, and if the times exceed the threshold, it is determined that the network element equipment board is in an abnormal state, and this detection process is ended; if the times do not exceed the threshold, Step 104 is continued to be performed.

Step 104: it is detected whether the OAM detection result which is reported by the network element equipment board and is matched with the monitoring ID is received, and if the OAM detection result is received, the OAM detection result is transferred to a network management interface to be displayed.

In particular, before detecting whether the OAM detection result which is reported by the network element equipment board and is matched with the monitoring ID is received, the method may further comprise following steps: detecting whether a stop OAM command sent by the user is received, and if the stop OAM command sent by the user is received, ending this detection process; and if the stop OAM command sent by the user is not received, performing the step of detecting whether OAM detection result which is reported by the network element equipment board and is matched with the monitoring ID is received.

It should be described that when the OAM detection result which is reported by the network element equipment board and is matched with the monitoring ID is not received in this step, it is judged whether receiving time is overtime, and if the receiving time is overtime, this detection process is ended; and if the receiving time is not overtime, Step 103 is performed.

Furthermore, after this step, the method may further comprise following steps: detecting a type of the OAM frame of the received OAM detection result, and if the type of the OAM frame is an Ethernet continuity check message, returning to Step 103, and if the type of the OAM frames is not the Ethernet continuity check message, ending this detection process.

The method provided by the present invention uses a unique and intelligent detection algorithm, which can very stably and flexibly detect the Ethernet OAM, and the method used by the present invention is suitable for any telecommunication network management system. The Ethernet OAM functions can be implemented in the Network Management System (NMS) or Element Management System (EMS), so it is very easy to configure and detect the Ethernet OAM for network elements of the whole network.

The specific implementation process of the method for detecting OAM based on a telecommunication network management system provided by the present invention will be illustrated in detail through a specific embodiment hereinafter.

Figure 2:
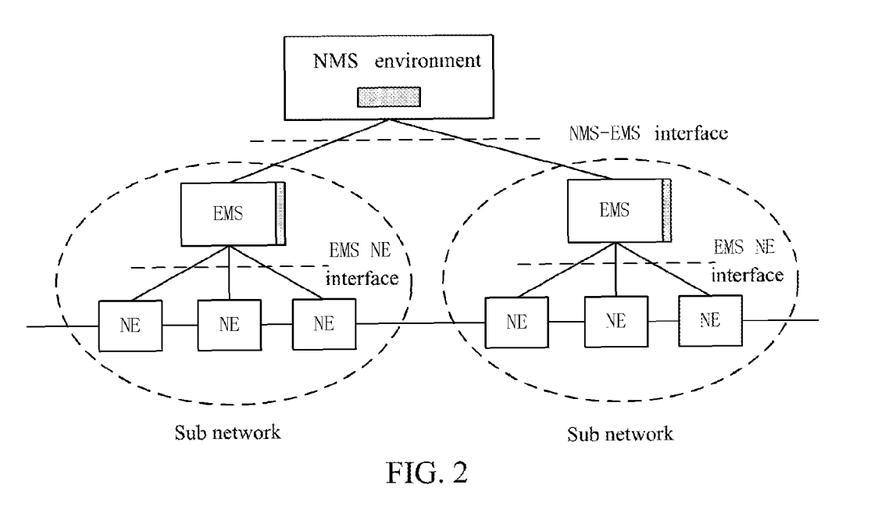
FIG. 2 is a diagram of the deployment of Ethernet OAM modules in NMS network management and EMS network management in the prior art.

The method provided by the embodiments of the present invention configures the Ethernet OAM and detects Ethernet OAM results through the telecommunication network management system with a plug-in mechanism. As the plug-in mechanism can deploy each independent functional module as a plug-in, the present invention deploys Ethernet OAM configuration and detection modules in the plug-in, can implement the loading of the plug-in when the system is started, and has the function of configuring and detecting Ethernet OAM after the successful loading. Meanwhile, as the EMS is connected with the network element and can directly configure the network element, and the NMS can manage and configure the network element through the EMS, the Ethernet OAM plug-in in the embodiments of the present invention can be implemented in the NMS and EMS. As shown in FIG. 2, it is the NMS and EMS deployment model, wherein the shaded part denotes that an Ethernet OAM plug-in can be deployed.

In particular, the process of detecting Ethernet OAM implemented by the embodiments of the present invention is as follows.

1. An Ethernet OAM plug-in is loaded.

The plug-in mechanism in the present invention is described as a background technique, which make each functional module to be deployed independently as a plug-in, and each plug-in can be dynamically loaded according to the requirements of the users, so that the functions of the network management system can be randomly simplified and enhanced as the requirements of the users, which greatly enhances the flexibility of the network management system. The present invention is implemented based on the above plug-in mechanism.

The principle of loading the Ethernet OAM plug-in will be described in detail hereinafter. The principle comprises: a user configuring the Ethernet OAM as a loading item in a policy file; and when the telecommunication network management system is started, the system dynamically loading an Ethernet OAM plug-in according to the policy file of the plug-in, and after the Ethernet OAM plug-in is successfully loaded, generating an interface object responsible for managing all the function entrances of the Ethernet OAM configuration and detection module in this Ethernet OAM configuration and detection module, and then registering the object as a Common Object Request Broker Architecture (CORBA) object for being invoked externally. The CORBA object is known as a plug-in object, and the functions that need to be implemented by the whole plug-in are all implemented by this plug-in object broker.

Figure 3:
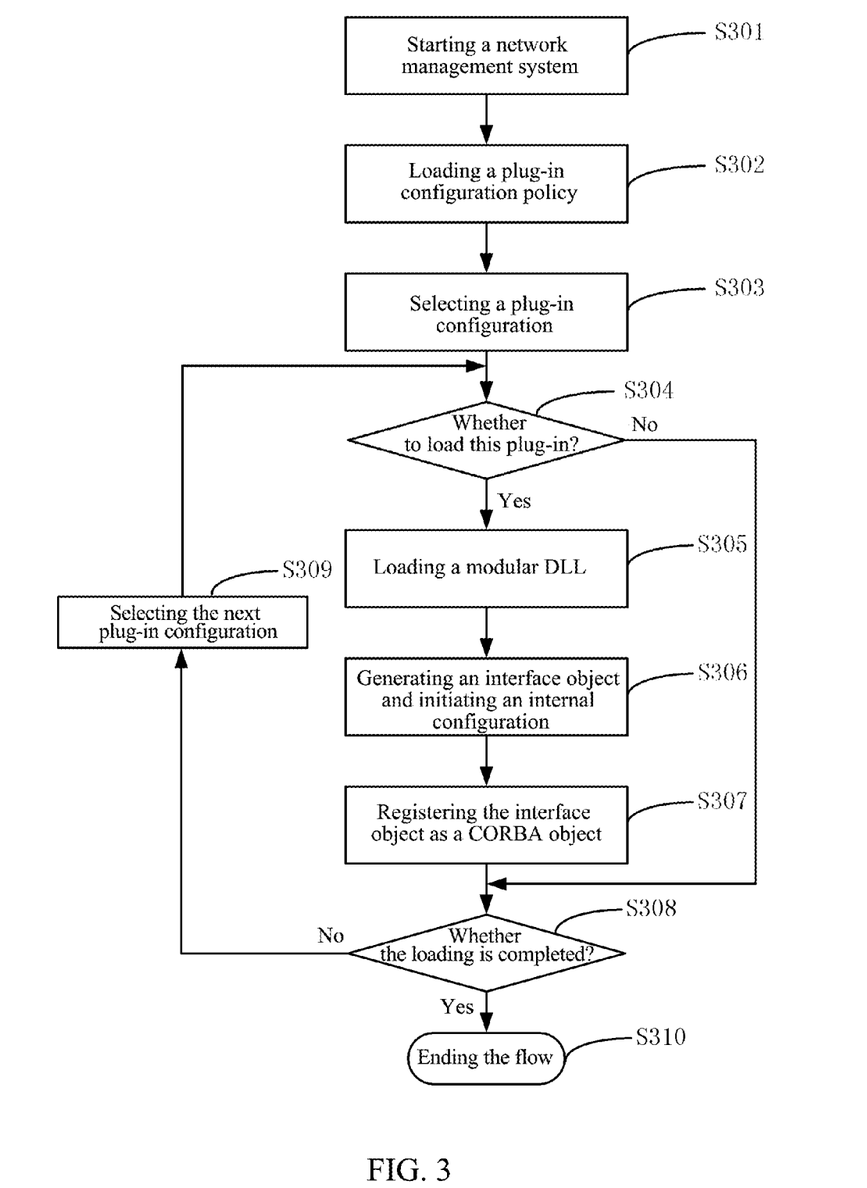
FIG. 3 is a flowchart of loading Ethernet OAM plug-in in a telecommunication network management system according to the embodiments of the present invention.

In particular, a flowchart of loading an Ethernet OAM plug-in in a telecommunication network management system in the embodiment, as shown in FIG. 3, comprises following steps.

Step 301: a user configures the Ethernet OAM as a loading item in a policy file of the telecommunication network management system, and the telecommunication network management system is started.

Step 302: a plug-in configuration policy is loaded.

Step 303: a plug-in configuration is selected.

Step 304: it is judged whether to load this plug-in, and if this plug-in is not loaded, Step 308 is performed; and if this plug-in is loaded, Step 305 is performed.

Step 305: a Dynamic Linkable Library (DLL) file of the functional module corresponding to this plug-in is loaded.

Step 306: an interface object is generated and an internal configuration is initiated.

Step 307: the interface object is registered as a CORBA object, wherein the CORBA object is used for being invoked externally. The CORBA object is known as a plug-in object, and the functions that need to be implemented by the whole plug-in are implemented by this plug-in object broker.

Step 308: it is judged whether the loading is completed, and if the loading is completed, Step 310 is performed; and if the loading is not completed, Step 309 is performed.

Step 309: the next plug-in configuration is selected, and Step 304 is performed.

Step S310: the process is ended.

2. The user can configure the Ethernet OAM Maintenance Entities Point (MEP) of network elements of the whole network and establish the Maintenance Entities Group (MEG) and ME according to specific requirements after completing to load the Ethernet OAM plug-in, which comprises:

(1) establishing the MEG, and configuring attributes such as a MEG Identifier (MEG-ID), and a friendly name etc., which are unique in the whole network, wherein the MEG is a maintenance group unit under an operator, and is responsible for the maintenance work of a plurality of MEs under this MEG, and one MEG-ID can include a plurality of boards.

(2) selecting the Ethernet port of the board in the MEG to act as a MEP, and configuring its MEP-ID, which is required to be unique in the MEG.

(3) establishing the ME, configuring a Maintenance Entities Identifier (ME-ID) and a friendly name, and selecting a near MEP and a remote MEP, wherein the ME can be considered as an interested Ethernet service connection under the MEG.

(4) supporting the selection of whether the OAM frames of the near MEP and the remote MEP have a Virtual Local Area Network (VLAN) label and the VLAN ID configuration, and further supporting configurations such as the type of the OAM frames, the sending mode of the OAM frames and the sending period of the OAM frames and so on at the same time, wherein when the MEP does not have a VLAN label, the VLAN ID configuration is not supported; the types of the OAM frames include Ethernet Continuity Check (ETH-CC), Ethernet Loopback (ETH-LB), Ethernet Frame Loss Measurements (ETH-LM) and Ethernet Frame Delay Measurements (ETH-DM) etc.

Figure 4:
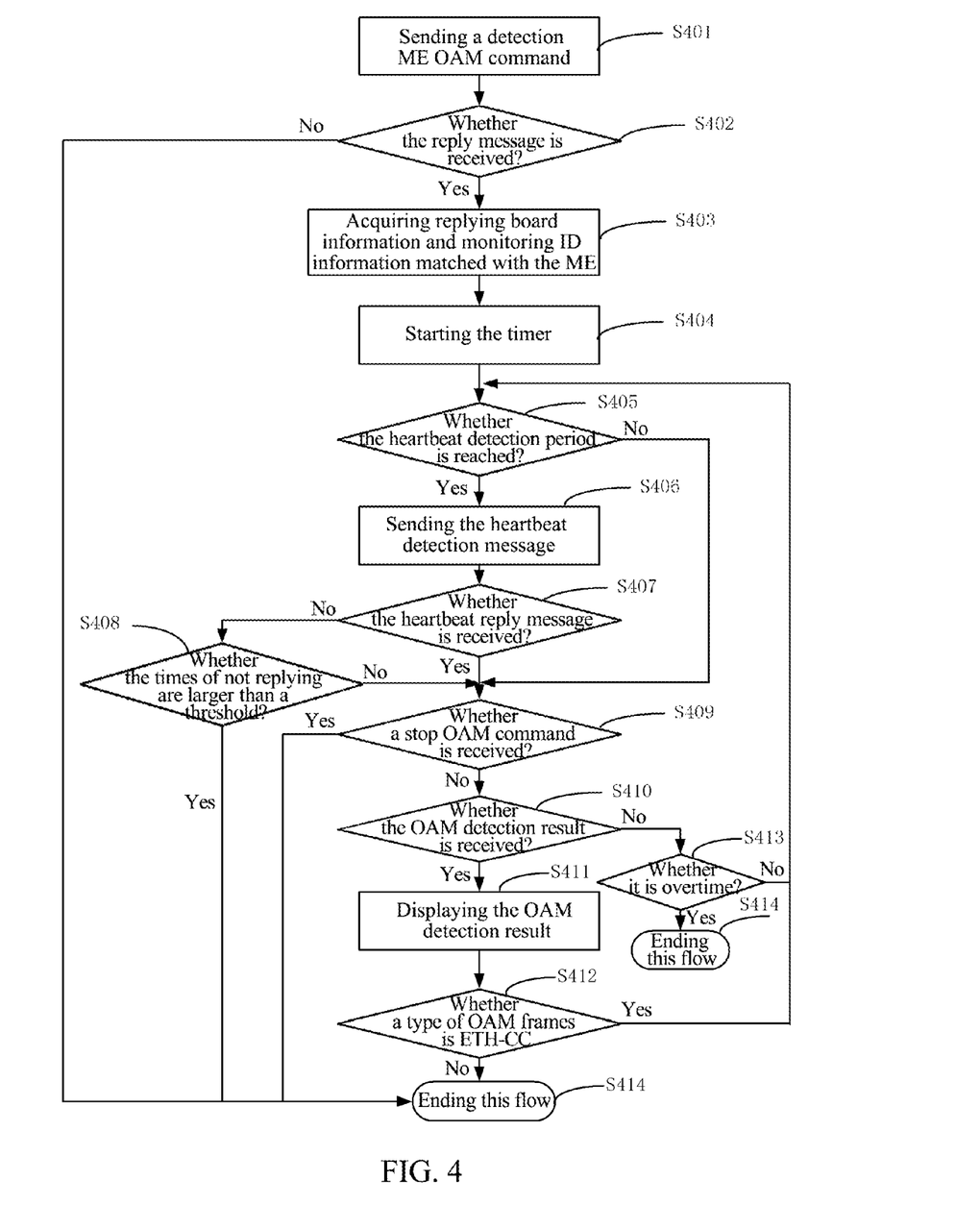
FIG. 4 is a flowchart of detecting an Ethernet OAM in a telecommunication network management system according to the embodiments of the present invention.

3. The process of detecting the Ethernet OAM starts after completing the configuration, as shown in FIG. 4, which specifically comprises following steps.

Step 401: the Ethernet OAM configuration and detection module of the telecommunication network management system starts to initiate the detection function after using activating the established ME, and sends a detection ME OAM command.

Step 402: it is judged whether the reply message of the network element equipment board is received, and if the reply message is received, Step 403 is performed; and if the reply fails or waits overtime, Step 414 is performed;

Step 403: the reply message sent by the network element equipment board is received, and of the replying board information and monitoring ID information matched with the ME are acquired from the reply message.

It should be described that the Ethernet OAM is actually performed between the Ethernet ports of the network element equipment boards, and the received reply message includes the board information. Meanwhile, when receiving a start ME OAM command sent by the Ethernet OAM configuration and detection module of the telecommunication network management system, the network element equipment board will reply and return the monitoring ID information matched the ME, wherein the monitoring ID information is identifier information which is automatically allocated by the equipment according to ME OAM command and represents this detecting task. The above board information and the monitoring ID information constitute the keywords for distinguishing detection results of a plurality of ME entities. The network management interface also uses this keyword to match, and each ME window may independently display the OAM detection results thereof.

Step 404: the timer is started.

Step 405: it is detected whether the ME reaches the pre-configured heartbeat detection time, and if the preconfigured heartbeat detection time is not reached, the step of heartbeat detection is skipped and Step 409 is performed; if the preconfigured heartbeat detection time is reached, Step 406 is performed.

It should be described that as the telecommunication network management system can start a plurality of ME entities simultaneously, while only one timer needs to be deployed inside the module, and the start time of each ME is different, thus the time when each ME reaches the heartbeat detection time is also different.

Step 406: when the heartbeat detection time is reached, the heartbeat detection message is sent, wherein the purpose of sending the heartbeat detection message is to detect whether the network element equipment board correctly processes the Ethernet OAM, and if the processing of the network element equipment board is abnormal, the state of the network element equipment board is acquired by the returned information of the heartbeat detection message.

Step 407: it is detected whether the heartbeat reply message is received, and if the heartbeat reply message is received, Step 409 is performed, and if the heartbeat reply message is not received, Step 408 is performed.

Step 408: it is judged whether the times of not receiving the heartbeat reply message reach a preconfigured threshold, and if the times reach the threshold, it is determined that the network element equipment board is in an abnormal state, and Step 414 is performed; if the times do not reach the threshold, it continues to perform Step 409.

Step 409: it is detected whether a stop OAM command sent by the user is received, and if the stop OAM command sent by the user is received, this ME detection flow is ended; and if the stop OAM command sent by the user is not received, Step 410 is performed.

Step 410: it is detect whether Ethernet OAM detection result which is reported by the network element equipment board and is matched with the monitoring ID is received, and if the Ethernet OAM detection result is not received, Step 413 is performed; and if the Ethernet OAM detection result is received, Step 411 is performed.

Step 411: the Ethernet OAM detection result reported by the network element equipment board is transferred to a network management interface to be displayed.

Step 412: it is detected whether a type of the OAM frame in the Ethernet OAM detection results is ETH-CC, and if the type of the OAM frames is the ETH-CC, Step 405 is performed, and if the type of the OAM frames is not the ETH-CC, Step 414 is performed, wherein for the ETH-CC detection, the OAM functions will be stopped initiatively only if the user sends a stop OAM command. For the detection types such as ETH-LB, ETH-LM and ETH-DM etc., as these detection types are one-time detection, the user can send the stop OAM command only before not receiving the OAM detection result, and the detection process ends after receiving the OAM detection result without the user sending the stop OAM command.

Step 413: it is detected whether the time of the network element equipment board not reporting the Ethernet OAM detection result is overtime, and if the time is overtime, Step 414 is performed; otherwise, Step 405 is performed.

Step 414: the ME detection flow is ended.

The method provided by the present invention uses a unique and intelligent detection algorithm, which can very stably and flexibly detect the Ethernet OAM, and the method used by the present invention is suitable for any telecommunication network management system. The Ethernet OAM functions can be implemented in the NMS or EMS, so it is very easy to configure and detect the Ethernet OAM for network elements of the whole network.

Figure 5:
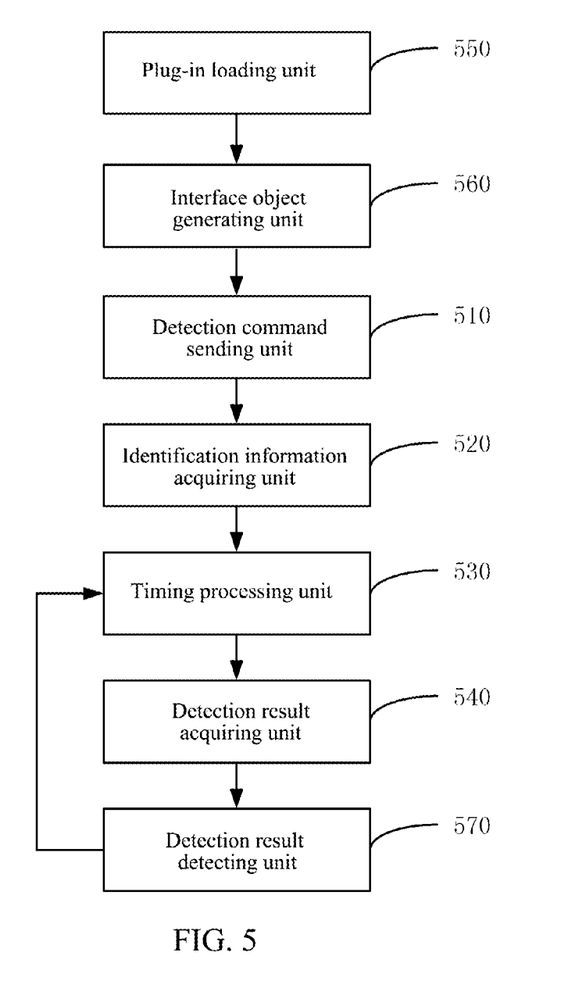
FIG. 5 is a structural diagram of the apparatus for detecting OAM based on a telecommunication network management system provided by the present invention.

An apparatus for detecting Ethernet OAM based on a telecommunication network management system is further provided by the present invention, and as shown in FIG. 5, the apparatus comprises: a detection command sending unit 510, an identifier information acquiring unit 520, a timing processing unit 530 and a detection result acquiring unit 540, wherein the detection command sending unit 510 is configured to: send a detection maintenance entity OAM command to a network element equipment board after a user activating an established ME;

the identifier information acquiring unit 520 is configured to: acquire the replying board information and the monitoring ID information matched with the maintenance entity when receiving a reply message sent by the network element equipment board;

the timing processing unit 530 is configured to: start a timer, detect whether the preconfigured heartbeat detection time is reached, and if the preconfigured heartbeat detection time is reached, send a heartbeat detection message, and trigger the detection result acquiring unit 540 after receiving the heartbeat reply message, and if the preconfigured heartbeat detection time is not reached, directly trigger the detection result acquiring unit 540; and the detection result acquiring unit 540 is configured to: detect whether the OAM detection result which is reported by the network element equipment board and is matched with the monitoring ID is received, and if the OAM detection result is received, transfer the OAM detection result to a network management interface to be displayed.

The apparatus provided by the present invention further comprises:

a plug-in loading unit 550, which is configured to: dynamically load an Ethernet OAM plug-in deployed with OAM configuration and detection functions according to a user preconfigured policy file when the system is started; and an interface object generating unit 560, which is configured to: generate an interface object responsible for managing all the OAM function entrances after successfully loading the Ethernet OAM plug-in, and register the interface object as a common object request broker architecture object.

Furthermore, the timing processing unit 530 is further configured to: judge whether times of not receiving the heartbeat reply message exceed a threshold when the heartbeat reply message is not received, and if the times exceed the threshold, determine a network element equipment board is in an abnormal state, and end this detection process; if the times do not exceed the threshold, trigger the detection result acquiring unit 540;

the detection result acquiring unit 540 is further configured to: detect whether a stop OAM command sent by the user is received, and if the stop OAM command sent by the user is received, end this detection process; and if the stop OAM command sent by the user is not received, detect whether the OAM detection result which is reported by the network element equipment board and is matched with the monitoring ID is received; and the detection result acquiring unit 540 is further configured to: judge whether receiving time is overtime when the OAM detection result which is reported by the network element equipment board and is matched with the monitoring ID is not received, and if the receiving time is overtime, end this detection process; and if the receiving time is not overtime, trigger the timing processing unit 530.

The apparatus provided by the present invention further comprises:

a detection result detecting unit 570, which is configured to: detect a type of the OAM frame of the received OAM detection result, and if the type of the OAM frame is an Ethernet continuity check message, trigger the timing processing unit 530, and if the type of the OAM frames is not the Ethernet continuity check message, end this detection process.

The apparatus provided by the present invention uses a unique and intelligent detection algorithm, which can very stably and flexibly detecting the Ethernet OAM, and the apparatus provided by the present invention is suitable for any telecommunication network management system. The Ethernet OAM functions can be implemented in the NMS or the EMS, so it is very easy to configure and detect the Ethernet OAM for network elements of the whole network.

Obviously, those skilled in the art can make various changes and variations to the present invention without departing from the spirit and scope of the present invention. Thus, if these modifications and variations of the present invention fall into the scope of the claims of the present invention and the equivalent techniques thereof, the invention is also intended to include these changes and variations.

INDUSTRIAL APPLICABILITY

The present invention uses a unique and intelligent detection algorithm, which can very stably and flexibly detect the Ethernet OAM, and is suitable for any telecommunication network management system. The Ethernet OAM functions can be implemented in the NMS or EMS, so it is very easy to configure and detect the Ethernet OAM for network elements of the whole network.

What is claimed is:

1. A method for detecting Ethernet Operation, Administration and Maintenance (OAM), and the method based on a telecommunication network management system and comprising:

sending a detection maintenance entity OAM command to a network element equipment board after a user activates an established maintenance entity;

receiving a reply message sent by the network element equipment board and acquiring replying board information and monitoring Identifier (ID) information matched with the maintenance entity; and detecting whether preconfigured heartbeat detection time is reached:

if the preconfigured heartbeat detection time is not reached, detecting whether a OAM detection result which is reported by the network element equipment board and is matched with a monitoring ID is received, and if the OAM detection result is received, transferring the OAM detection result to a network management interface to be displayed;

if the preconfigured heartbeat detection time is reached, sending a heartbeat detection message, and detecting whether the OAM detection result which is reported by the network element equipment board and is matched with the monitoring ID is received after receiving a heartbeat reply message, and if the OAM detection result is received, transferring the OAM detection result to the network management interface to be displayed.

2. The method according to claim 1, before the step of sending the detection maintenance entity OAM command, the method further comprising:

when the system is started, dynamically loading an Ethernet OAM plug-in deployed with Ethernet OAM configuration and detection functions according to a user preconfigured policy file; and generating an interface object responsible for managing all OAM function entrances after successfully loading the Ethernet OAM plug-in, and registering the interface object as a common object request broker architecture object.

3. The method according to claim 1, after the step of sending the heartbeat detection message, the method further comprising:

when the heartbeat reply message is not received, judging whether times of not receiving the heartbeat reply message exceed a threshold, and if the times exceed the threshold, determining the network element equipment board is in an abnormal state, and ending this detection process; and if the times do not exceed the threshold, continuing to perform the step of detecting whether OAM detection result which is reported by the network element equipment board and is matched with the monitoring ID is received.

4. The method according to claim 1, before the step of detecting whether the OAM detection result which is reported by the network element equipment board and is matched with the monitoring ID is received, the method further comprising:

detecting whether a stop OAM command sent by the user is received, and if the stop OAM command sent by the user is received, ending this detection process;

performing the step of detecting whether the OAM detection result which is reported by the network element equipment board and is matched with the monitoring ID is received only if the stop OAM command sent by the user is not received.

5. The method according to claim 1, after the step of detecting whether the OAM detection result which is reported by the network element equipment board and is matched with the monitoring ID is received, the method further comprising:

when the OAM detection result which is reported by the network element equipment board and is matched with the monitoring ID is not received, judging whether receiving time is overtime, and if the receiving time is overtime, ending this detection process; and if the receiving time is not overtime, returning to perform the step of detecting whether the preconfigured heartbeat detection time is reached.

6. The method according to claim 1, after the step of detecting whether the OAM detection result which is reported by the network element equipment board and is matched with the monitoring ID is received, the method further comprising:

detecting a type of a OAM frame of the received OAM detection result, and if the type of the OAM frame is Ethernet continuity check, returning to perform the step of detecting whether the preconfigured heartbeat detection time is reached, and if the type of the OAM frame is not the Ethernet continuity check, ending this detection process.

7. An apparatus for detecting Ethernet Operation, Administration and Maintenance (OAM), and the apparatus based on a telecommunication network management system and comprising: a detection command sending unit, an identifier information acquiring unit, a timing processing unit and a detection result acquiring unit, wherein the detection command sending unit is configured to: send a detection maintenance entity OAM command to a network element equipment board after a user activates an established maintenance entity;

the identifier information acquiring unit is configured to: receive a reply message sent by the network element equipment board, acquire replying board information and monitoring Identifier (ID) information matched with the maintenance entity, and trigger the timing processing unit;

the timing processing unit is configured to: detect whether preconfigured heartbeat detection time is reached, and if the preconfigured heartbeat detection time is reached, send a heartbeat detection message, and trigger the detection result acquiring unit after receiving a heartbeat reply message, and if the preconfigured heartbeat detection time is not reached, trigger the detection result acquiring unit; and the detection result acquiring unit is configured to: detect whether an OAM detection result which is reported by the network element equipment board and is matched with a monitoring ID is received, and if the OAM detection result is received, transfer the OAM detection result to a network management interface to be displayed.

8. The apparatus according to claim 7, further comprising:

a plug-in loading unit, which is configured to: dynamically load an Ethernet OAM plug-in deployed with OAM configuration and detection functions according to a user preconfigured policy file when the system is started; and an interface object generating unit, which is configured to: generate an interface object responsible for managing all OAM function entrances after successfully loading the Ethernet OAM plug-in, and register the interface object as a common object request broker architecture object.

9. The apparatus according to claim 7, wherein the timing processing unit is further configured to: judge whether times of not receiving the heartbeat reply message exceed a threshold when the heartbeat reply message is not received, and if the times exceed the threshold, determine the network element equipment board is in an abnormal state, and end this detection process;

if the times do not exceed the threshold, trigger the detection result acquiring unit;

the detection result acquiring unit is further configured to: detect whether a stop OAM command sent by the user is received, and if the stop OAM command sent by the user is received, end this detection process; and the detection result acquiring unit is further configured to: determine whether receiving time is overtime when the OAM detection result which is reported by the network element equipment board and is matched with the monitoring ID is not received, and if the receiving time is overtime, end this detection process, and if the receiving time is not overtime, trigger the timing processing unit.

10. The apparatus according to claim 7, further comprising:
the detection result detecting unit, which is configured to: detect a type of a OAM frame of the OAM detection result received by the detection result acquiring unit, and if the type of the OAM frame is Ethernet continuity check, trigger the timing processing unit, and if the type of the OAM frames is not the Ethernet continuity check, end this detection process.

11. The method according to claim 2, after the step of sending the heartbeat detection message, the method further comprising:
when the heartbeat reply message is not received, judging whether times of not receiving the heartbeat reply message exceed a threshold, and if the times exceed the threshold, determining the network element equipment board is in an abnormal state, and ending this detection process; and if the times do not exceed the threshold, continuing to perform the step of detecting whether OAM detection result which is reported by the network element equipment board and is matched with the monitoring ID is received.

12. The method according to claim 2, before the step of detecting whether the OAM detection result which is reported by the network element equipment board and is matched with the monitoring ID is received, the method further comprising:
detecting whether a stop OAM command sent by the user is received, and if the stop OAM command sent by the user is received, ending this detection process;
performing the step of detecting whether the OAM detection result which is reported by the network element equipment board and is matched with the monitoring ID is received only if the stop OAM command sent by the user is not received.

13. The method according to claim 2, after the step of detecting whether the OAM detection result which is reported by the network element equipment board and is matched with the monitoring ID is received, the method further comprising:
when the OAM detection result which is reported by the network element equipment board and is matched with the monitoring ID is not received, judging whether receiving time is overtime, and if the receiving time is overtime, ending this detection process; and if the receiving time is not overtime, returning to perform the step of detecting whether the preconfigured heartbeat detection time is reached.

14. The method according to claim 2, after the step of detecting whether the OAM detection result which is reported by the network element equipment board and is matched with the monitoring ID is received, the method further comprising:
detecting a type of a OAM frame of the received OAM detection result, and if the type of the OAM frame is Ethernet continuity check, returning to perform the step of detecting whether the preconfigured heartbeat detection time is reached, and if the type of the OAM frame is not the Ethernet continuity check, ending this detection process.

15. The apparatus according to claim 8, wherein
the timing processing unit is further configured to: judge whether times of not receiving the heartbeat reply message exceed a threshold when the heartbeat reply message is not received, and if the times exceed the threshold, determine the network element equipment board is in an abnormal state, and end this detection process; if the times do not exceed the threshold, trigger the detection result acquiring unit;
the detection result acquiring unit is further configured to: detect whether a stop OAM command sent by the user is received, and if the stop OAM command sent by the user is received, end this detection process; and
the detection result acquiring unit is further configured to: determine whether receiving time is overtime when the OAM detection result which is reported by the network element equipment board and is matched with the monitoring ID is not received, and if the receiving time is overtime, end this detection process, and if the receiving time is not overtime, trigger the timing processing unit.

16. The apparatus according to claim 8, further comprising:
the detection result detecting unit, which is configured to: detect a type of a OAM frame of the OAM detection result received by the detection result acquiring unit, and if the type of the OAM frame is Ethernet continuity check, trigger the timing processing unit, and if the type of the OAM frames is not the Ethernet continuity check, end this detection process.

* * * * *